United States Patent [19]

Edelmann et al.

[11] Patent Number: 5,759,252
[45] Date of Patent: Jun. 2, 1998

[54] MIXTURES OF CARBOXYLIC ACID SALTS AND CARBOXYLIC ACID ESTERS AND THEIR USE AS SICCATIVES FOR OXIDATIVELY DRYING LACQUERS

[75] Inventors: Dirk Edelmann, Wuppertal, Germany; Alain Pattou, Viviers les Montagnes, France; Günter Link, Goslar, Germany

[73] Assignee: Borchers GmbH, Bomlitz, Germany

[21] Appl. No.: 826,743

[22] Filed: Apr. 7, 1997

[30] Foreign Application Priority Data

Apr. 19, 1996 [DE] Germany .................. 196 15 450.2
May 31, 1996 [DE] Germany .................. 196 21 866.7

[51] Int. Cl.$^6$ .................. C09F 9/00; C09D 7/12
[52] U.S. Cl. .................. 106/310; 106/243
[58] Field of Search .................. 106/243, 310

[56] References Cited

U.S. PATENT DOCUMENTS

| | | | |
|---|---|---|---|
| 2,361,027 | 10/1944 | Hansley et al. | 106/310 |
| 3,124,475 | 3/1964 | Fischer et al. | 106/310 |
| 4,689,266 | 8/1987 | Eckler | 428/334 |

FOREIGN PATENT DOCUMENTS 4236697  5/1994  Germany .

OTHER PUBLICATIONS

Kirk–Othmer Encyclopedia of Chemical Technology, 2nd edition, vol. 7, pp. 272–275, 278–285, Jul. 3, 1966
Ullmann, Encyclopadie der Chemie, vol. 23, pp. 421–424 (month unavailable) (1979.) (no translation).

*Primary Examiner*—David Brunsman
*Attorney, Agent, or Firm*—Joseph C. Gil; Thomas W. Roy

[57] ABSTRACT

The present invention relates to compositions containing

A) 10 to 90 wt. % of one or more metal salts of long chain carboxylic acids corresponding to formula (I)

$$(M^{n+})(X^-)_n \tag{I}$$

wherein
M represents a metal cation,
x represents a $C_6$–$C_{14}$ aliphatic and/or aromatic carboxylate and
n represents an integer from 1 to 5, and B) 10 to 90 wt. % of a carboxylic acid ester corresponding to formula (II)

$$R^1-\underset{\underset{O}{\|}}{C}-OR^2, \tag{II}$$

wherein
$R^1$ represents a saturated or unsaturated aliphatic $C_{14}$–$C_{22}$ residue and
$R^2$ represents a $C_1$–$C_4$ alkyl group.

The present invention also relates to a process for the production of these mixtures and to their use as drying agents (siccatives) in oxidatively drying coating compositions (lacquers).

5 Claims, No Drawings

MIXTURES OF CARBOXYLIC ACID SALTS AND CARBOXYLIC ACID ESTERS AND THEIR USE AS SICCATIVES FOR OXIDATIVELY DRYING LACQUERS

BACKGROUND OF THE INVENTION

Field of the Invention

The present invention relates to mixtures of salts of long chain carboxylic acids with carboxylic acid esters, to a process for their production and to their use as siccatives for oxidatively drying lacquers.

Description of the Prior Art

It is known to use metal salts as drying agents for oxidatively drying lacquers.

For example, metal salts of isooctanoic acid, naphthenic acid, linseed oil fatty acids and also acids with alkylene oxide units may be produced by the direct reaction with metals or metal oxides or hydroxides. A discussion of known drying agents and mixtures and production processes may be found, for example, in Lehrbuch der Lacke und Beschichtungen. vol. 111, 1976, pp. 296 to 476 or in Ullmann, Encyclopädie der Chemie. vol. 23, pp. 421 to 424, 1979.

These known drying agents are usually dissolved in volatile organic solvents or directly produced in organic solvents. Even those drying agents which have recently been developed for aqueous, oxidatively drying coating compositions are initially produced in organic solvents, such as xylene. The compounds set forth in DE-A 42 36 697 are examples of such water dilutable drying agents.

There have been considerable efforts to minimize the amount of volatile organic solvents in all types of coating compositions, including oxidatively drying lacquers. This also includes solvents present in the siccatives added thereto. This is principally being done for environmental and toxicological reasons, but also for safety during the production and application of the lacquers.

An object of the present invention is to provide drying agents which do not contain organic solvents, which are volatile at room temperature, either during the production process or in the delivery or application form. A further object of the present invention is to provide storage stable siccatives, which may be processed in a straightforward manner and have substantially higher metal contents when compared to known prior art solvent free drying agents, such as cobalt lineolate. Because of their higher metal contents, the actual quantity of siccatives to be added to the lacquer may be distinctly reduced. A final object of the present invention is to provide siccative formulations which may be used in 100% solvent-free, oxidatively drying coating compositions (so-called "high-solids" systems) without introducing volatile organic constituents into the coating composition.

These objects may be achieved with the drying agents according to the present invention. In these drying agents the corresponding metal cation or corresponding metal cations (in "combination drying agents") are (partially) neutralized with 2-ethylhexanoic acid or other organic carboxylic acids and then dissolved in low viscosity and neutral long chain carboxylic acid esters which are non-volatile at room temperature.

SUMMARY OF THE INVENTION

The present invention relates to compositions containing
A) 10 to 90 wt. % of one or more metal salts of long chain carboxylic acids corresponding to formula (I)

$$(M^{m+})(X^-)_n \tag{I}$$

wherein
M represents a metal cation,
X represents a $C_6$–$C_{14}$ aliphatic and/or aromatic carboxylate and
n represents an integer from 1 to 5, and B) 10 to 90 wt. % of a carboxylic acid ester corresponding to formula (II)

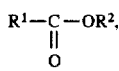
$$R^1-\underset{\underset{O}{\|}}{C}-OR^2, \tag{II}$$

wherein
$R^1$ represents a saturated or unsaturated aliphatic $C_{14}$–$C_{22}$ residue and
$R^2$ represents a $C_1$–$C_4$ alkyl group.

The present invention also relates to a process for the production of these mixtures by mixing 10 to 90 wt. % of a carboxylic acid corresponding to formula (III)

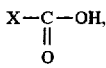
$$X-\underset{\underset{O}{\|}}{C}-OH, \tag{III}$$

with 10 to 90 wt. of a carboxylic acid ester corresponding to formula (II)

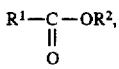
$$R^1-\underset{\underset{O}{\|}}{C}-OR^2, \tag{II}$$

and within, 20 to 60 minutes, adding a stoichiometric quantity, based on the carboxylic acid of formula (III), of a basic metal salt corresponding to formula (IV)

$$(M_{m+})(Y^-)_n \tag{IV},$$

wherein
X, M, $R^1$, $R^2$ and n have the meaning set forth above and
Y represents OH, O or $CO_3$, in such a manner that the temperature does not exceed 90° C. and removing the water formed as a by-product by distillation at a bottom temperature of 90° to 150° C.

The present invention further relates to the use of the mixtures according to the invention as drying agents (siccatives) in oxidatively drying coating compositions (lacquers).

DETAILED DESCRIPTION OF THE INVENTION

For the purposes of the invention, drying agents are ionogenic metal compounds which are added to unsaturated oils and/or binders (as the oxidatively drying constituent in coating compositions) to substantially reduce their drying times, i.e., the transition of films from a liquid to a solid phase. This process proceeds by oxidative crosslinking of the oils and/or binders to yield three dimensional networks. This reaction is accelerated by metal cations. Drying agents are generally liquids or solids. In dissolved form the drying agents are also known as siccatives.

Particularly suitable esters corresponding to formula (II) for the purposes of the invention are methyl esters of saturated and unsaturated fatty acids, including synthetic or natural mixtures thereof. Preferred examples of these solvents, which are non-volatile and have a low viscosity at room temperature, include oleic acid methyl ester, 9,12-linoleic acid methyl ester, dehydrated castor acid methyl ester, ricinoleic acid methyl ester and α-elaeotearic acid methyl ester.

Mixtures of the methyl esters of these fatty acids, which are obtained by the hydrolysis of naturally occurring oils, are particularly preferred. Preferred examples of natural sources of fatty acid mixtures, which may be esterified to obtain the esters of formula (II) include soya oil, rapeseed oil, tall oil and sunflower oil. The resultant mixtures of fatty acid esters are commercially available.

Known carboxylic acids may be used as the anionic-organic residue of the metal salts used as drying agents. Preferred compounds include 2-ethylhexanoic acid and/or naphthenic acid or mixtures thereof in siccatives having two or more different metal cations. Preferred metal cations include Co, Mn, Fe, Pb, V, Ni, Cu, Zn, Sn, Ca, Ba, Sr, Cl, Al, K, Cr, Sb and Bi.

The siccatives according to the invention are low viscosity, storage stable, clear, optionally colored liquids which do not contain constituents which are volatile at room temperature.

The siccatives according to the invention may be used alone or in admixture with each other. The drying agents may also be combined with various non-volatile compounds or they may contain various metal cations or metal oxide cations.

According to the invention, the drying agents or siccatives according to the invention are used in pure form, i.e., without further addition of volatile organic solvents or water.

The quantity of drying agents or siccatives used is determined by the degree of unsaturation of the binders and by the nature of the binders used in the lacquers. Further factors which influence the quantity used include pigments and the type and quantity of anti-oxidants and other additives, such as wetting agents.

Preferably, the siccatives according to the invention are used at the same metal concentration (i.e., metal content in relation to binder) as the same siccatives containing solvent produced according to the prior art. It is thus an important advantage of the siccatives according to the invention that they have the same or at least no worse drying characteristics than known siccatives containing solvent. As a general rule, the drying agents are used in quantities of 0.005 to 1 wt. %, preferably 0.005 to 0.7 wt. %, based on the metal content of the drying agents in relation to the lacquer binder solids content.

The novel siccatives may be added to any oxidatively drying coating composition containing organic solvents and also to any solvent-free, "high-solids" coating compositions.

The invention is further illustrated but is not intended to be limited by the following examples in which all parts and percentages are by weight unless otherwise specified.

EXAMPLES

The amounts of the siccatives are based on the total weight of the coating composition.

Preparation of drying agents

1. Preparation of a cobalt drying agent in tall oil methyl ester 2725 kg of 2-ethylhexanoic acid and 825 kg of tall oil methyl ester were introduced into a reactor of a volume of 6000 liters. 50 kg of water and 25 kg of diethylene glycol monobutyl ether were also stirred in. This mixture was stirred for 10 minutes at 40° to 50° C.

Over a period of 20 minutes, 2000 kg of cobalt(II) hydroxide were added.

The heat of reaction raised the temperature of the batch to approx. 85° to 90° C. Once the cobalt hydroxide had been added, the water formed during the reaction was removed by distillation at a bottom temperature of 118° C.

Once all of the water (300 liters) had been distilled off, the distillation condenser was replaced with a condenser and the batch stirred for approx. 1 hr at 112°–120° C.

In order to remove any residual water from the mixture, 25 kg of Primisil 511 (Rhône-Poulenc; non ionic emulgator) were added and then 500 kg of tall oil methyl ester. The insoluble constituents were filtered out at a temperature of 115° C. The filter residue was rinsed twice with 200 kg portions of tall oil methyl ester and the filtrates were introduced into a container. A metal content of 12 wt. % was then established in the finished product by adding an additional 100 kg of tall oil methyl ester. The product was a violet, clear liquid.

2. Preparation of a cobalt drying agent in soya oil methyl ester 3225 kg of 2-ethylhexanoic acid were weighed into a 6000 liter reaction vessel. 50 kg of water and 260 kg of diethylene glycol monobutyl ether were also added and the components were mixed at 40° C. 1000 kg of cobalt(II) hydroxide were then cautiously added within 20 minutes. The reaction mixture was adjusted to a temperature of 85° to 90° C. and stirred at this temperature for 30 minutes.

The water formed and other volatile constituents were then removed by distillation at a bottom temperature of 118° C. Once the reaction was complete, the mixture was stirred for a further 30 minutes at 115° C.

The crude product was then transferred into a 5000 liter reactor and the line was rinsed with 100 liter of soya oil methyl ester and combined with the crude product. The insoluble components were then removed from the mixture by filtration and the filter residue was washed with a total of 700 kg of soya oil methyl ester. The combined filtrates constituted the product, which was adjusted to a metal content of 12 wt. % by adding additional soya oil methyl ester. 5125 kg of pure product were obtained. The resulting cobalt(II) octoate dissolved in soya oil methyl ester was a violet, clear liquid having a viscosity of 200 to 500 mPa's.

EXAMPLES 1–2

Drying of a coating composition containing an alkyd resin

A standard commercial coating composition having the following composition was prepared for subsequent mixing with siccatives:

52.2% alkyl resin (90% alkyd resin in mineral spirits, COPORAB 267.9 from Robbe)

1.03% Bentone gel (anorganic thickener)

0.41 Borchigen SN 88 (polyurethane based wetting agent)

37.6% titanium dioxide 8.50% mineral spirits K60

0.26% Borchinox M2 (ethyl-ethyl-ketoneoxime

This standard formulation was combined with the siccatives set forth in Table 1 and applied at a wet film thickness of 100 μm. The drying time (Braive table, tack-free) and pendulum hardness (Persoz) of these films were determined. The properties of the coatings are set forth in Table 1.

TABLE 1

Drying tests of coating compositions containing alkyd resins

| Example No. | Siccative | Drying time | Pendulum hardness (Persoz) (sec) | | |
|---|---|---|---|---|---|
| | | | 2 d | 4 d | 7 d |
| 1 (Comp) | 0.5% of Tr. 69 in TB[1] | 7 h | 27 | 42 | 55 |
| 2 | 0.5% of Tr. 69 in MESJ[2] | 9.3 h | 31 | 42 | 76 |

[1]Tr. 69 is a mixture of cobalt octoate and zirconium octoate having a Co content of 6% and Zr content of 9%; 72% solution in mineral spirits.
[2]Siccative 69 MESJ is a mixture of cobalt and zirconium octoate having a Co content of 6% and a Zr content of 9%; 72% solution in soya oil methyl ester.

EXAMPLES 3-4

Drying of a coating composition containing an alkyd resin based on linseed oil

A standard formulation was prepared as described in Examples 1-2 with the exception that the binder was replaced on a 1:1 weight basis with a different alkyl resin, i.e., a 100% solids, oxidatively drying alkd resin based on linseed oil (Uralac XZP263 from DSM). This composition was then combined with the quantities of siccatives set forth in Table 2 and applied and tested as in Examples 1-2. The properties of the coatings are set forth in Table 2.

TABLE 2

Drying tests of coating compositions containing an alkyd resin based on linseed oil

| Example No. | Siccative | Drying time | Pendulum hardness (Persoz) (sec) | | |
|---|---|---|---|---|---|
| | | | 1 d | 4 d | 7 d |
| 3 (Comp) | 0.3% of Co10 TB[1] 2.0% of Zr12 TB[2] 1.0% of Ca10 TB[3] | 2.4 h | 40 | 34 | 36 |
| 4 | 0.25 of Co12 MESJ[4] 1.33% of Zr18 MESJ[5] 1.0% of Ca10 TB | 4.3 h | 41 | 34 | 34 |

[1]Co10 TB is a 64% solution of cobalt octoate in mineral spirits.
[2]Zr12 TB is a 50% solution of zirconium octoate in mineral spirits.
[3]Ca10 TB is a 55% solution of la octoate in mineral spirits.
[4]Co12 MESJ is a 74% solution of cobalt octoate in soya oil methyl ester.
[5]Zr18 MESJ is a 75% solution of zirconium octoate in soya oil methyl ester.

EXAMPLES 5-8

Drying of a coating composition containing an alkyd resin

A standard formulation was prepared as described in Examples 1-2 with the exception that the binder was replaced on a 1:1 weight basis with a different alkyd resin, i.e., (Uralac XP 98 AH from DSM). This composition was then combined with the quantities of siccatives set forth in Table 3 and applied and tested as in Examples 1-2. The properties of the coatings are set forth in Table 3.

Uralac αP98 has 100% solids and is an oxidatively drying alkyd resin based on linseed oil.

TABLE 3

Drying tests of coating compositions containing an alkyd resin

| Sample No. | Siccative | Drying time | Pendulum hardness (Persoz) (sec) | | |
|---|---|---|---|---|---|
| 5 (Comp) | 0.24% of Co12 TB 1.17% of Zr18 TB | 3.75 h | 52 | 51 | 52 |
| 6 | 0.25% of Co12 MERP[1] 1.17 of Zr18 MERP[2] | 4.0 h | 56 | 53 | 51 |
| 7 (Comp) | 0.25% of Co12 TB 0.31% of Zn16 TB[3] 0.25% of Mn10 TB[4] | 5.5 h | 52 | 46 | 42 |
| 8 | 0.25% of Co12 MESJ 0.31% of Zn16 MESJ[5] 0.25% of Mn10 MESJ[6] | 6.15 h | 49 | 47 | 45 |

[1]Co12 MERP is a 74% solution of cobalt octoate in rapeseed oil methyl ester.
[2]Zr18 MERP is a 75% solution of zirconium octoate in rapeseed oil methyl ester.
[3]Zn16 TB is a 71 solution of zinc octoate in mineral spirits.
[4]Mn10 TB is a 70% solution of manganese octoate in mineral spirits.
[5]Zn16 MESJ is a 71 solution of zinc octoate in soya oil methyl ester.
[6]Mn10 MESJ is a 70% solution of manganese octoate in soya oil methyl ester.

EXAMPLES 9-10

Drying of a coating composition containing an alkyd resin based on linseed oil

A standard formulation was prepared as described in Examples 1-2 with the exception that the binder was replaced on a 1:1 weight basis with a different alkyl resin, i.e., a 90% oxidatively drying alkyd resin based on linseed oil (Synolac E94 154 from Cray Valley). This composition was then combined with the quantities of siccatives set forth in Table 4 and applied and tested as in Examples 1-2. The properties of the coatings are set forth in Table 4.

TABLE 4

Drying tests of coating compositions containing an alkyd resin based on linseed oil

| Sample no. | Siccative | Drying time | Pendulum hardness (Persoz) (sec) | | |
|---|---|---|---|---|---|
| | | | 1 d | 4 d | 7 d |
| 9 (Comp) | 0.25% of Co12 TB 0.31% of Zn16 TB 0.25% of Mn10 TB | 9.5 h | 42 | 42 | 38 |
| 10 | 0.25% of Co12 DP93[1] 0.31% of Zn16 DP93[2] 0.25% of Mn10 DP9[3] | 8.75 h | 43 | 43 | 39 |

[1]Co12 DP93 is a 74% solution of cobalt octoate in tall oil methyl ester.
[2]Zn16 DP93 is a 71 solution of zinc octoate in tall oil methyl ester.
[3]Mn10 DP93 is a 70% solution of manganese octoate in tall oil methyl ester.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A composition containing
   A) 10 to 90 wt. % of one or more metal salts of long chain carboxylic acids corresponding to formula (I)

$$(M^{m+})(X^-)_m \ (I),$$

wherein

M represents a metal cation, x represents a $C_6$–$C_{14}$ aliphatic and/or aromatic carboxylate and n represents an integer from 1 to 5, and B) 10 to 90 wt. % of a carboxylic acid ester corresponding to formula (II)

$$R^1-\underset{\underset{O}{\|}}{C}-OR^2, \qquad (II)$$

wherein $R^1$ represents a saturated or unsaturated aliphatic $C_{14}$–$C_{22}$ residue and $R^2$ represents a $C_1$–$C_4$ alkyl group.

2. The composition of claim 1 wherein said metal cation comprises a member selected from the group consisting of Co, Mn, Fe, Pb, V, Ni, Cu, Zn, Sn, Ca, Ba, Sr, Cl, Al, K, Cr, Sb and Bi.

3. An coating composition containing an oxidatively drying binder and, as siccative, the composition of claim 1.

4. A process for the production of a composition which comprises by mixing 10 to 90 wt. % of a carboxylic acid corresponding to formula (III)

$$X-\underset{\underset{O}{\|}}{C}-OH, \qquad (III)$$

with 10 to 90 wt. of a carboxylic acid ester corresponding to formula (II)

$$R^1-\underset{\underset{O}{\|}}{C}-OR^2, \qquad (II)$$

and within, 20 to 60 minutes, adding a stoichiometric quantity, based on the carboxylic acid of formula (III), of a basic metal salt corresponding to formula (IV)

$$(M^{n+})(Y-)_2 \qquad (IV),$$

wherein

M represents a metal cation, x represents a $C_{6-14}$ aliphatic and/or aromatic carboxylate, Y represents OH, O or $CO_3$, $R^1$ represents a saturated or unsaturated aliphatic $C_{14}$–$C_{22}$ residue, $R^2$ represents a $C_1$–$C_4$ alkyl group and n represents an integer from 1 to 5, in such a manner that the temperature does not exceed 90° C. and removing the water formed as a by-product by distillation at a bottom temperature of 90° to 150° C.

5. The process of claim 4 wherein said metal cation comprises a member selected from the group consisting of Co, Mn, Fe, Pb, V, Ni, Cu, Zn, Sn, Ca, Ba, Sr, Cl, Al, K, Cr, Sb and Bi.

* * * * *